United States Patent
Saito et al.

(10) Patent No.: US 10,281,008 B2
(45) Date of Patent: May 7, 2019

(54) SPEED REDUCTION OR SPEED INCREASING APPARATUS

(71) Applicant: THK CO., LTD., Tokyo (JP)

(72) Inventors: Hideo Saito, Tokyo (JP); Yuichi Mizutani, Tokyo (JP)

(73) Assignee: THK CO., LTD., Tokyo (JP)

(*) Notice: Subject to any disclaimer, the term of this patent is extended or adjusted under 35 U.S.C. 154(b) by 0 days.

(21) Appl. No.: 15/569,128

(22) PCT Filed: Apr. 12, 2016

(86) PCT No.: PCT/JP2016/061766
§ 371 (c)(1),
(2) Date: Oct. 25, 2017

(87) PCT Pub. No.: WO2016/189989
PCT Pub. Date: Dec. 1, 2016

(65) Prior Publication Data
US 2018/0106328 A1 Apr. 19, 2018

(30) Foreign Application Priority Data

May 25, 2015 (JP) ................................ 2015-105072
Mar. 2, 2016 (JP) ................................ 2016-039521

(51) Int. Cl.
*F16H 1/32* (2006.01)
*F16C 19/10* (2006.01)
(Continued)

(52) U.S. Cl.
CPC .............. *F16H 1/32* (2013.01); *F16C 19/10* (2013.01); *F16C 33/581* (2013.01);
(Continued)

(58) Field of Classification Search
CPC .......................... F16H 1/321; Y10T 74/18336
See application file for complete search history.

(56) References Cited

U.S. PATENT DOCUMENTS

| 544,796 A | * | 8/1895 | Shaw | F16H 1/321 475/164 |
| 1,611,981 A | * | 12/1926 | Amberg | F16H 1/321 475/164 |

(Continued)

FOREIGN PATENT DOCUMENTS

| CN | 2235046 | 9/1996 |
| DE | 838100 | 5/1952 |

(Continued)

OTHER PUBLICATIONS

International Search Report, PCT/JP2016/061766, dated Jul. 19, 2016.

(Continued)

*Primary Examiner* — Stacey A Fluhart
(74) *Attorney, Agent, or Firm* — Young & Thompson

(57) ABSTRACT

A speed reduction apparatus supports a third crown gear that undergoes wave motion. The speed reduction apparatus includes: a first crown gear; a second crown gear; a third crown gear having opposing teeth facing the first crown gear and opposing teeth facing the second crown gear, back to back; and cam units and that cause the third crown gear to undergo wave motion. The cam units and have a first cam on the first crown gear side with respect to the third crown gear, and a second cam on the second crown gear side with respect to the third crown gear. The first and second cams sandwich the third crown gear. A first rolling element between the first cam and the third crown gear is capable of rolling motion, and a second rolling element between the second cam and the third crown gear is capable of rolling motion.

12 Claims, 19 Drawing Sheets

(51) Int. Cl.
*F16C 33/58* (2006.01)
*F16H 37/12* (2006.01)
*F16H 48/14* (2006.01)
*F16H 53/02* (2006.01)

(52) U.S. Cl.
CPC ........... *F16C 33/585* (2013.01); *F16H 1/321* (2013.01); *F16H 37/12* (2013.01); *F16C 2380/27* (2013.01); *F16H 48/147* (2013.01); *F16H 53/02* (2013.01); *F16H 2200/0043* (2013.01)

(56) References Cited

U.S. PATENT DOCUMENTS

| | | | |
|---|---|---|---|
| 2,699,690 A * | 1/1955 | Kobler | F16H 1/321 475/164 |
| 4,966,573 A | 10/1990 | Yokoi | |
| 5,022,802 A | 6/1991 | Yokoi | |
| 5,383,821 A | 1/1995 | Murakami et al. | |
| 9,316,289 B2 * | 4/2016 | Takahashi | F16H 1/321 |

FOREIGN PATENT DOCUMENTS

| | | |
|---|---|---|
| DE | 3033521 | 4/1982 |
| JP | 59-39346 | 3/1984 |
| JP | 60-004647 | 1/1985 |
| JP | 1-229165 | 9/1989 |
| JP | 6-235445 | 8/1994 |
| SU | 1545019 | 2/1990 |

OTHER PUBLICATIONS

German Office Action dated Jun. 13, 2018 in corresponding German Patent Application No. 112016002380.4 with English translation of German Office Action.

Chinese Office Action for Application No. 201680030287, dated Jul. 4, 2018, with partial English translation provided.

* cited by examiner

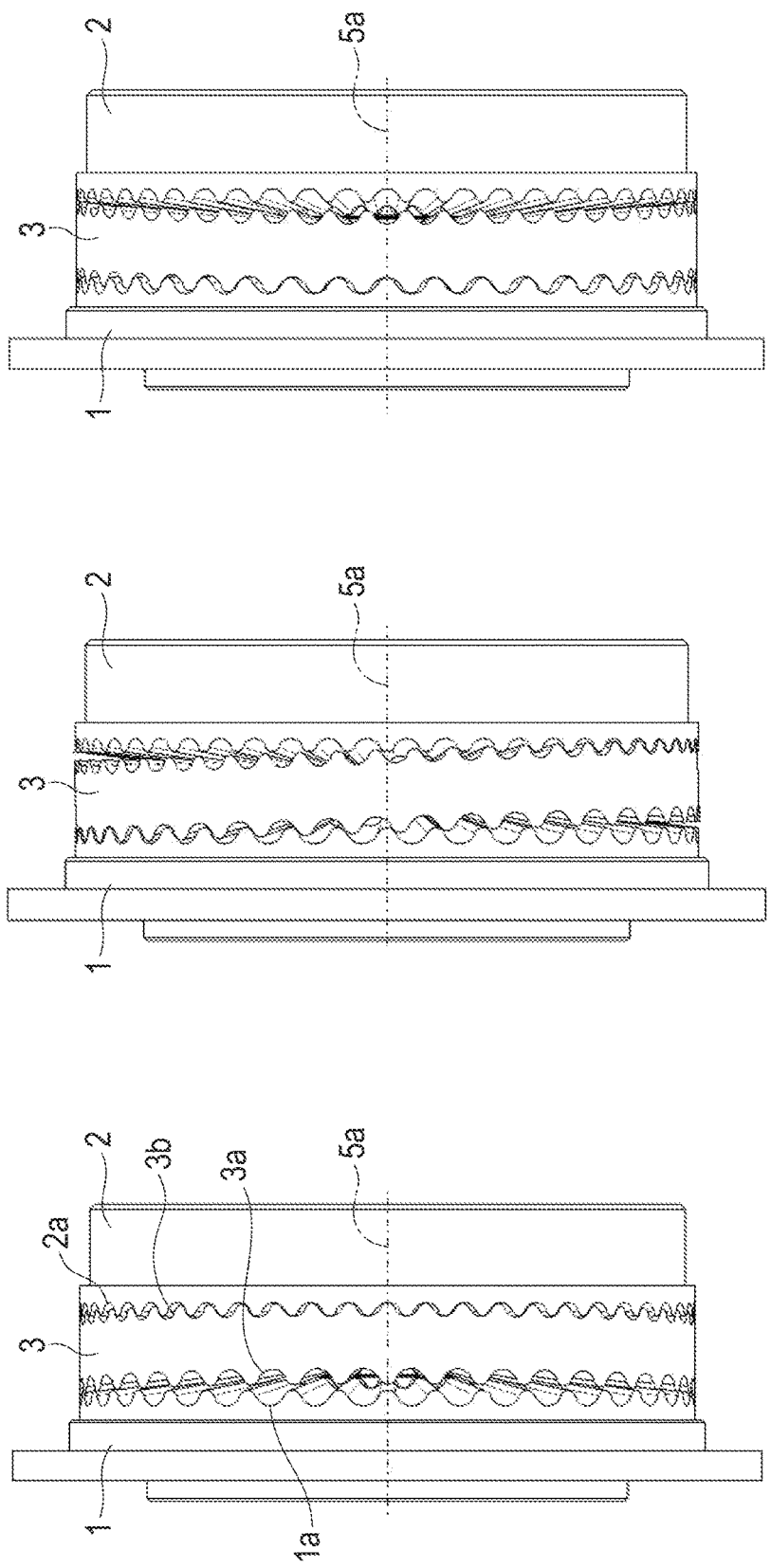

SPEED REDUCTION OR SPEED INCREASING APPARATUS

TECHNICAL FIELD

The present invention relates to a speed reduction or speed increasing apparatus including a first crown gear, a second crown gear, and a third crown gear having teeth facing the first crown gear and teeth facing the second crown gear back to back in such a manner to engage with the first and second crown gears with an inclination.

BACKGROUND ART

Patent Literature 1 discloses a speed reduction apparatus including a first crown gear, a second crown gear, and a third crown gear. The third crown gear is placed with an inclination between the first and second crown gears in such a manner that the third crown gear engages with the first crown gear and the third crown gear engages with the second crown gear. The third crown gear is rotatably supported by an input shaft including a bent portion. The input shaft causes the third crown gear to undergo wave motion in such a manner that the location of contact between the first and third crown gears and the location of contact between the third and second crown gears move in a circumferential direction.

The first crown gear is fixed to a housing. The second crown gear is coupled to an output shaft. When the input shaft is rotated, the wave motion of the third crown gear causes the third crown gear to make rotations equal to the difference in the number of teeth between the first and third crown gears, relatively to the first crown gear. Moreover, the wave motion of the third crown gear causes the second crown gear to make rotations equal to the difference in the number of teeth between the second and third crown gears, relatively to the third crown gear. The speed of rotation of the second crown gear is the combined total of the speed of rotation of the third crown gear relative to the first crown gear and the speed of rotation of the second crown gear relative to the third crown gear. When two pairs of gears (the first and third crown gears, and the third and second crown gears) are rotated in directions where they cancel each other out, a large speed reduction ratio is obtained. When the two pairs of gears are rotated in directions where they encourage each other, a small speed reduction ratio is obtained.

CITATION LIST

Patent Literature

Patent Literature 1: JP 60-4647 A

SUMMARY OF INVENTION

Technical Problem

However, the speed reduction apparatus described in Patent Literature 1 has a problem that needs to be solved in terms of structure. This problem prevents the practical utilization thereof. In other words, in the speed reduction apparatus, a cross roller ring is used as a bearing that rotatably supports the third crown gear at the bent portion of the input shaft. The reason why the cross roller ring is used is to withstand a large moment that acts on the bearing due to a reaction produced at the location of contact between gears. The cross roller ring is a bearing where multiple rollers are arranged in such a manner that the axes of adjacent rollers are at right angles to each other, and can withstand a large moment.

However, in the nature of the speed reduction apparatus, the input shaft rotates at high speed, and the output shaft rotates at low speed. If the cross roller ring is used as the bearing of the input shaft that rotates at high speed, the slippage of the roller causes the bearing to generate heat, and an increase in torque loss; accordingly, the efficiency is reduced. If a ball is used instead of the cross roller to avoid the reduction in efficiency, the third crown gear cannot be supported with high stiffness. Also if the locations of the input side and the output side of the speed reduction apparatus are exchanged to use the speed reduction apparatus as a speed increasing apparatus, a similar problem arises.

Hence, an object of the present invention is to provide a speed reduction or speed increasing apparatus that can support a third crown gear that undergoes wave motion with high stiffness, and can also improve efficiency.

Solution to Problem

In order to solve the above problem, one aspect of the present invention is a speed reduction or speed increasing apparatus that includes a first crown gear; a second crown gear; a third crown gear having opposing teeth facing the first crown gear and opposing teeth facing the second gear, back to back; and a cam unit configured to incline the third crown gear with respect to the first and second crown gears in such a manner that the third crown gear engages with the first crown gear and the third crown gear engages with the second crown gear, and to cause the third crown gear to undergo wave motion in such a manner that locations of contact move in a circumferential direction, the cam unit includes a first cam placed on the first crown gear side with respect to the third crown gear, and a second cam placed on the second crown gear side with respect to the third crown gear, the first cam and the second cam sandwich the third crown gear, a first rolling element is disposed between the first cam and the third crown gear in such a manner as to be capable of rolling motion, and a second rolling element is disposed between the second cam and the third crown gear in such a manner as to be capable of rolling motion.

Advantageous Effects of Invention

According to the present invention, the third crown gear that undergoes wave motion is sandwiched between the first cam and the second cam; accordingly, the third crown gear can be supported with high stiffness. Moreover, the first and second balls are disposed between the first and second cams and the third crown gear; accordingly, it is possible to smoothly rotate the third crown gear and improve the efficiency of the speed reduction or speed increasing apparatus.

BRIEF DESCRIPTION OF DRAWINGS

FIGS. 4A, 4B, and 4C are side views illustrating changes in the location of contact between a first crown gear and a third crown gear and the location of contact between the third crown gear and a second crown gear of the speed reduction apparatus of the embodiment (the locations of contact move 90 degrees from FIG. 4A to FIG. 4B, and the locations of contact move 90 degrees from FIG. 4B to FIG. 4C).

DESCRIPTION OF EMBODIMENTS

An embodiment of a speed reduction or speed increasing apparatus of the present invention is described in detail hereinafter with reference to the accompanying drawings. However, the speed reduction or speed increasing apparatus of the present invention can be embodied in various modes, and is not limited to the embodiment described in the description. The embodiment is provided with the intention of enabling those skilled in the art to fully understand the scope of the invention by sufficiently disclosing the description. Moreover, an example of a speed reduction apparatus that reduces the speed of rotation of an input shaft to transmit the speed of rotation to an output shaft is described in the embodiment. However, the locations of the input and output shafts of the speed reduction apparatus are exchanged to also make the speed reduction apparatus available as a speed increasing apparatus.

<The Entire Configuration of a Speed Reduction Apparatus of a First Embodiment>

Figure 1:
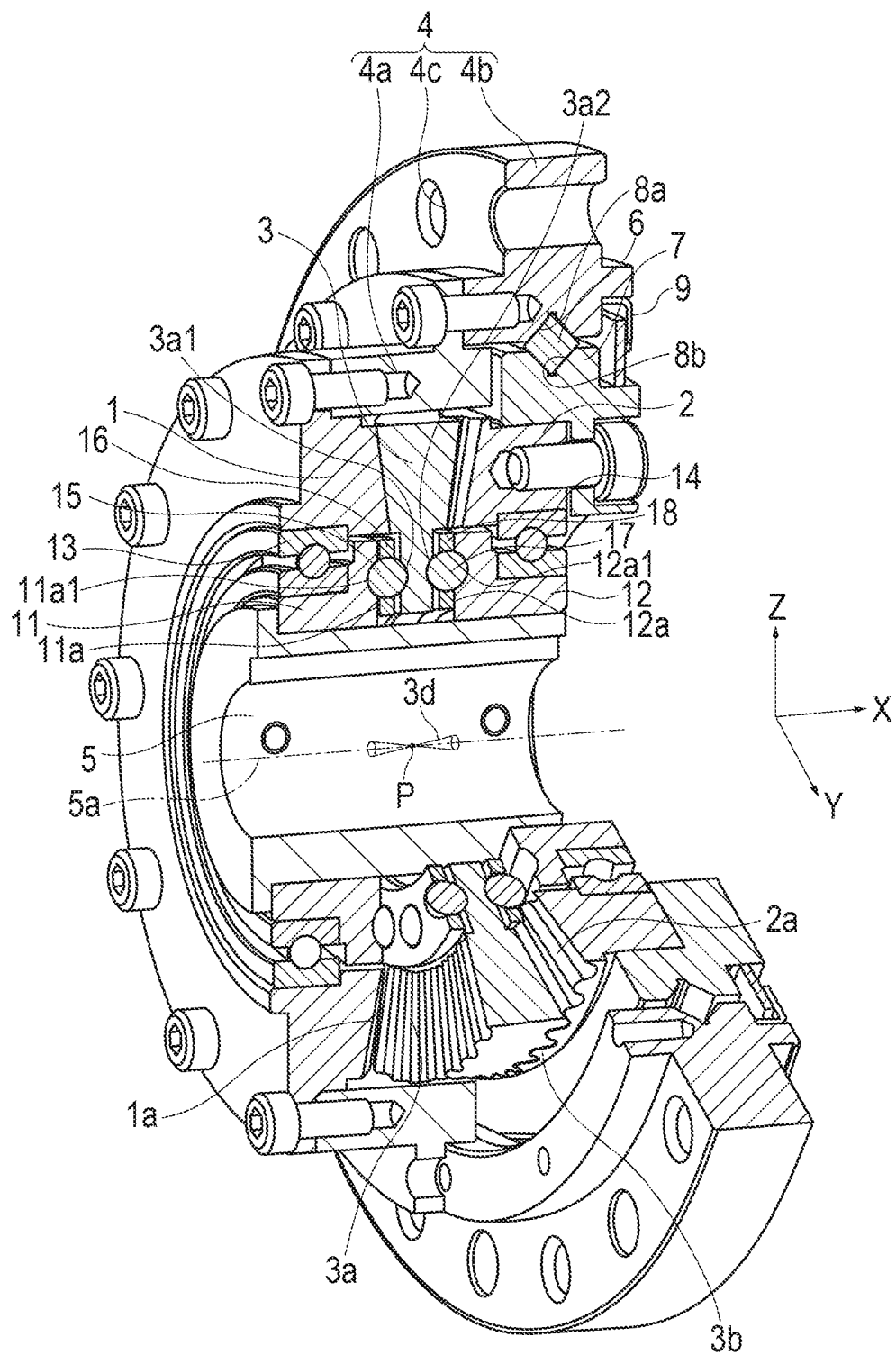
FIG. 1 is a cross-sectional perspective view of a speed reduction apparatus according to one embodiment of the present invention.
Figure 2:
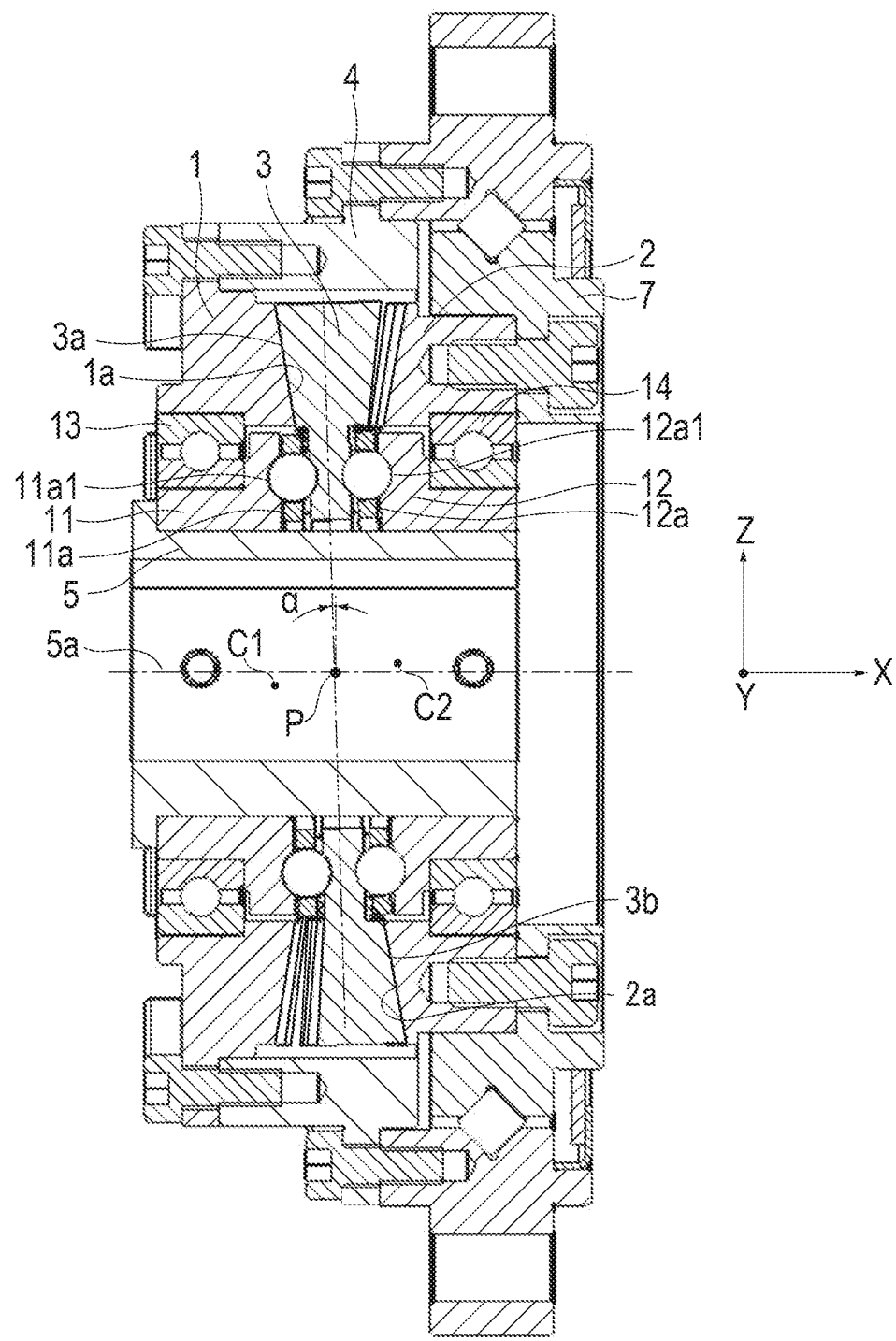
FIG. 2 is a cross-sectional view of the speed reduction apparatus of the embodiment.

FIG. 1 is a cross-sectional perspective view of a speed reduction apparatus according to a first embodiment of the present invention. FIG. 2 is a cross-sectional view. Both of FIGS. 1 and 2 illustrate cross-sectional views taken along the center line of an input shaft. The same reference signs are assigned to the same configurations throughout the accompanying drawings and the following description. A cylindrical input shaft 5 and a ring-shaped output portion 7 are rotatably housed in a housing 4. An axis 5a of the input shaft 5 agrees with an axis of the output portion 7. When the input shaft 5 is rotated, the speed of rotation of the input shaft 5 is reduced to be transmitted to the output portion 7. The speed reduction ratio is determined by the numbers of teeth of a first crown gear 1, a second crown gear 2, and a third crown gear 3 that are housed in the housing 4. For convenience of description, the configuration of the speed reduction apparatus is described below, using directions when the axis 5a of the input shaft 5 and the output portion 7 is placed in an X direction, that is, X, Y, and Z directions illustrated in FIG. 1.

The housing 4 includes a cylindrical housing body 4a, and a flange 4b fixed by a fastening member such as a bolt at one end of the housing body 4a in the X direction. Through-holes 4c for attaching the speed reduction apparatus to a counterpart are opened in the flange 4b.

The output portion 7 is rotatably supported by the flange 4b, for example, via cross rollers 6. A ring-shaped raceway 8a with a V-shaped cross section is formed in an inner peripheral surface of the flange 4b. A ring-shaped raceway 8b with a V-shaped cross section, which faces the raceway 8a, is formed in an outer peripheral surface of the output portion 7. The cross rollers 6 are arranged between these raceways 8a and 8b. The cross rollers 6 are used; accordingly, it is possible to withstand a large force such as a moment acting on the output portion 7 due to a reaction produced at the location of contact between the second crown gear 2 and the third crown gear 3. A labyrinth seal 9 to protect the entry of foreign substances such as dust into the cross rollers 6 is attached to an inner side of the flange 4b.

The ring-shaped first crown gear 1 and the ring-shaped second crown gear 2 are placed in the housing body 4a in such a manner that the axes of the first crown gear 1 and the second crown gear 2 agree with the axis 5a of the input shaft 5. The third crown gear 3 is placed between the first crown gear 1 and the second crown gear 2. The first crown gear 1 has ring-shaped opposing teeth 1a on a side facing the third crown gear 3 (refer also to FIG. 3). The second crown gear 2 has ring-shaped opposing teeth 2a on a side facing the third crown gear 3 (refer also to FIG. 3). The third crown gear 3 has ring-shaped opposing teeth 3a facing the first crown gear 1 and ring-shaped opposing teeth 3b facing the second crown gear 2, back to back (refer also to FIG. 3). The detailed forms of the opposing teeth 1a, 2a, 3a, and 3b of the first crown gear 1, the second crown gear 2, and the third crown gear 3 are described below.

The third crown gear 3 is inclined about a Y-axis by an angle α with respect to a plane orthogonal to the axis 5a (the X-axis) of the input shaft 5 (a Y-Z plane) (refer to FIG. 2). The third crown gear 3 is inclined to cause the opposing teeth 3a thereof to engage with the opposing teeth 1a of the first crown gear 1 at one point in a circumferential direction, and to cause the opposing teeth 3b thereof to engage with the opposing teeth 2a of the second crown gear 2 at one point in the circumferential direction.

As illustrated in FIG. 1, the first crown gear 1 is fixed by a fastening member such as a bolt at an end of the housing body 4a in the X-axis direction. The first crown gear 1 forms a part of the housing 4. Consequently, the size reduction of the speed reduction apparatus in the X-axis direction can be promoted. The second crown gear 2 is fixed by a fastening member such as a bolt to the output portion 7, and rotates together with the output portion 7.

The input shaft 5 penetrates the first crown gear 1 and the second crown gear 2. The input shaft 5 is rotatably supported by the first crown gear 1 and the second crown gear 2 via bearings 13 and 14.

A cam unit that causes the third crown gear 3 to undergo wave motion is attached to the input shaft 5. The cam unit includes a first cam 11 placed on the first crown gear 1 side with respect to the third crown gear 3, and a second cam 12 placed on the second crown gear 2 side with respect to the third crown gear 3. The first and second cams 11 and 12 have first and second inclined surfaces 11a and 12a that are parallel to each other and inclined with respect to the axis 5a. The first and second inclined surfaces 11a and 12a are inclined about the Y-axis by the angle α with respect to the plane orthogonal to the axis 5a (the X-axis) of the input shaft 5 (the Y-Z plane) as in the third crown gear 3 (refer to FIG. 2). The third crown gear 3 is axially sandwiched between the first cam 11 and the second cam 12.

As illustrated in FIG. 1, first balls 15 as first rolling elements are disposed between the first cam 11 and the third crown gear 3 in such a manner as to be capable of rolling motion. The first inclined surface 11a of the first cam 11 is formed into a circular shape when viewed from the axis 5a (the X-axis) direction (refer to FIG. 3). A first ball rolling groove 11a1 that is circular when viewed from a direction orthogonal to the first inclined surface 11a is formed in the first inclined surface 11a. A circular third ball rolling groove 3c1 facing the first ball rolling groove 11a1 is formed in a surface, which faces the first crown gear 1, of the third crown gear 3. Multiple first balls 15 are arranged between these first and third ball rolling grooves 11a1 and 3c1. The first and third ball rolling grooves 11a1 and 3c1 are designed in such a manner that the first balls 15 can receive axial and radial loads. The first balls 15 are held by a ring-shaped cage 16.

Second balls 17 as second rolling elements are disposed between the second cam 12 and the third crown gear 3 in such a manner as to be capable of rolling motion. A second ball rolling groove 12a1 that is circular when viewed from a direction orthogonal to the second inclined surface 12a is formed in the second inclined surface 12a of the second cam 12. A circular fourth ball rolling groove 3c2 facing the second ball rolling groove 12a1 is formed in a surface, which faces the second crown gear 2, of the third crown gear 3. Multiple second balls 17 are arranged between these second and fourth ball rolling grooves 12a1 and 3c2. The second and fourth ball rolling grooves 12a1 and 3c2 are designed in such a manner that the second balls 17 can receive axial and radial loads. The second balls 17 are held by a ring-shaped cage 18.

The first balls 15 and the second balls 17 are preloaded to prevent the creation of backlash on the third crown gear 3 sandwiched between the first and second cams 11 and 12. In other words, the first balls 15 are compressed between the first and third ball rolling grooves 11a1 and 3c1, and the second balls 17 are compressed between the second and fourth ball rolling grooves 12a1 and 3c2.

When the input shaft 5 is rotated with an unillustrated drive source such as a motor, the third crown gear 3 sandwiched between the first cam 11 and the second cam 12 undergoes wave motion (in other words, a center line 3d of the third crown gear 3 rotates in such a manner as to describe the loci of two cones. The wave motion is called precession). The apices of the cones are indicated by a point P in FIGS. 1 and 2. The point P is a center point of the wave motion of the third crown gear 3. The third crown gear 3 pivots on the point P like a seesaw when viewed from the side. As illustrated in FIG. 2, a center C1 of the circular first ball rolling groove 11a1 is displaced from the axis 5a of the input shaft 5 to enable the placement of the center P of the wave motion of the thick third crown gear 3 on the axis. A center C2 of the circular second ball rolling groove 12a1 is displaced from the axis 5a of the input shaft 5 to a side opposite to the center C1 of the first ball rolling groove 11a1 in such a manner as to be symmetrical about the point P to enable the placement of the center P of the wave motion of the thick third crown gear 3 on the axis 5a.

With the wave motion of the third crown gear 3, the location of contact between the first crown gear 1 and the third crown gear 3 and the location of contact between the third crown gear 3 and the second crown gear 2 move in the circumferential direction. The locations of contact move 90 degrees from FIG. 4A to FIG. 4B. The locations of contact move 90 degrees from FIG. 4B to FIG. 4C. With the wave motion of the third crown gear 3, the third crown gear 3 makes rotations equal to the difference in the number of teeth between the third crown gear 3 and the first crown gear 1 about the axis 5a relatively to the first crown gear 1. Moreover, the second crown gear 2 makes rotations equal to the difference in the number of teeth between the second crown gear 2 and the third crown gear 3 about the axis 5a relatively to the third crown gear 3. The speed of rotation of the second crown gear 2 is the combined total of the speed of rotation of the third crown gear 3 relative to the first crown gear 1 and the speed of rotation of the second crown gear 2 relative to the third crown gear 3. When two pairs of gears (the first crown gear 1 and the third crown gear 3, and the third crown gear 3 and the second crown gear 2) are rotated in directions where they cancel each other out, a large speed reduction ratio can be obtained. When the two pairs of gears are rotated in directions where they encourage each other, a small speed reduction ratio can be obtained.

The number of the opposing teeth 1a of the first crown gear 1 is referred to as Z1, the number of the opposing teeth 3a of the third crown gear 3 that engages with the opposing teeth 1a of the first crown gear 1 as Z2, the number of the opposing teeth 3b of the third crown gear 3 that engages with the second crown gear 2 as Z3, and the number of teeth of the opposing teeth 2a of the second crown gear 2 as Z4. A speed reduction ratio GR is given by the following equation 1:

$$GR = \frac{1}{\left\{\left(\frac{Z_2 - Z_1}{Z_1}\right) + \left(\frac{Z_4 - Z_3}{Z_4}\right)\right\}} \qquad \text{[Math. 1]}$$

Assume that, for example, Z1=40, Z2=41, Z3=51, and Z4=50. The speed reduction ratio is 200. Assume that Z1=50, Z2=49, Z3=50, and Z4=50. The speed reduction ratio is 50. The entire speed reduction ratio GR can be obtained from the speed reduction ratio of a first gear (the first crown gear 1 and the third crown gear 3) and the speed reduction ratio of a second gear (the third crown gear 3 and the second crown gear 2). Various speed reduction ratios from a low speed reduction ratio to a high speed reduction ratio can be set.

Assume that Z1=Z2. The first crown gear 1 has only a role of stopping the rotation of the third crown gear 3. The speed reduction ratio is left to the second gear. Assume that Z1 ≠

Z2. The first gear has a role of stopping rotation and reducing speed. Moreover, if the settings are Z2>Z1 and Z3<Z4, or Z2<Z1 and Z3>Z4, the first and second gears can be rotated in the directions where they cancel each other out; therefore, a high speed reduction ratio can be obtained.

Figure 3:
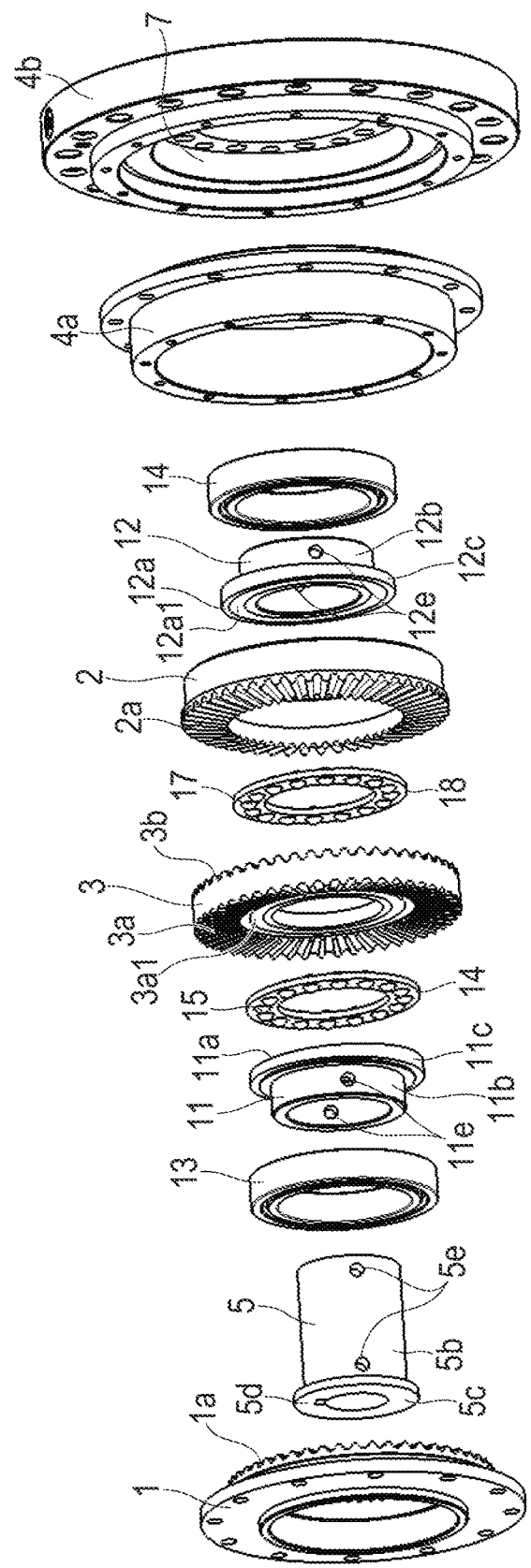
FIG. 3 is an exploded perspective view of the speed reduction apparatus of the embodiment.

The detailed structures of the input shaft 5 and the first and second cams 11 and 12 are described with reference to FIG. 3. The input shaft 5 is straight, and penetrates the first and second cams 11 and 12, and the third crown gear 3. As illustrated in FIG. 3, the input shaft 5 includes a cylindrical body portion 5b and a flange 5c. A key groove 5d for stopping the rotation of a counter part is formed in the body portion 5b. Moreover, holes 5e into which pins (not illustrated) for fixing the input shaft 5 and the first and second cams 11 and 12 are inserted are formed in the body portion 5b.

The first cam 11 includes a cylindrical body portion 1ib that is inserted into the bearing 13 (refer to FIG. 1) and a flange 11c on which the first inclined surface 11a is formed. A hole 11e into which a pin is inserted is formed in the first cam 11. The second cam 12 also includes a cylindrical body portion 12b that is inserted into the bearing 14 (refer to FIG. 1) and a flange 12c on which the second inclined surface 12a is formed. A hole 12e into which a pin is inserted is also formed in the second cam 12. The first cam 11 and the second cam 12 are of the same shape. However, the first cam 11 and the second cam 12 are not limited to the same shape. The centers of gravity of the entire first cam 11 and second cam 12 are on the axis 5a of the input shaft 5. Even if the first cam 11 and the second cam 12 are rotated at high speed, the run-out of them can be prevented.

<The Forms of Teeth of the First to Third Crown Gears (an Example where the Top Portion and the Bottom Portion are Formed by a Side Surface of a Cone)>

Figure 5A:
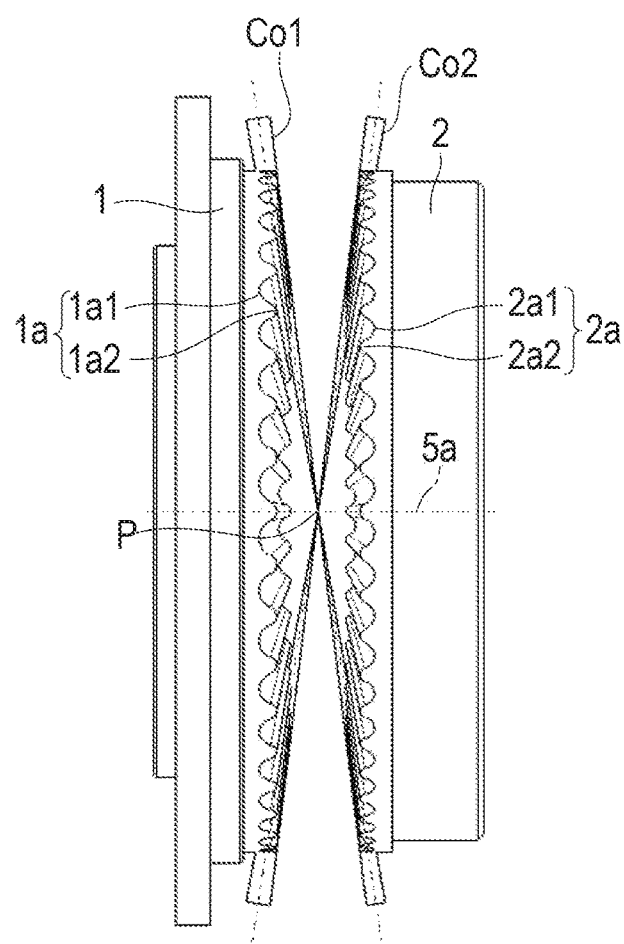
FIGS. 5A and 5B are side views illustrating the forms of the teeth of the first, second, and third crown gears of the embodiment (FIG. 5A illustrates the first and second crown gears, and FIG. 5B illustrates the third crown gear).
Figure 5B:
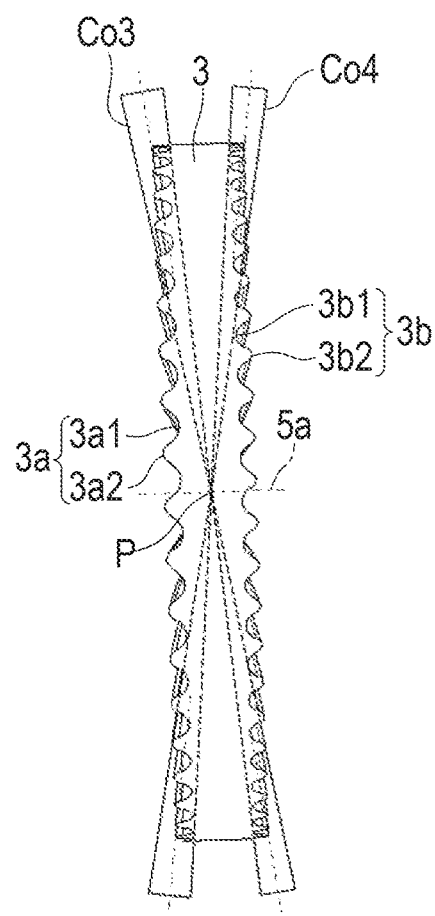

The forms of teeth of the first crown gear 1, the second crown gear 2, and the third crown gear 3 are described with reference to FIGS. 5A and 5B to FIG. 7. FIG. 5A illustrates a side view of the first crown gear 1 and the second crown gear 2. FIG. 5B illustrates a side view of the third crown gear 3. The first crown gear 1 is bevel gear-shaped and has a conical body. The wave-shaped opposing teeth 1a are continuously formed in the circumferential direction on a surface, which faces the third crown gear 3, of the ring-shaped first crown gear 1. The first crown gear 1 alternately includes, in the circumferential direction, a plurality of top portions 1a2 that are placed radially, and a plurality of bottom portions 1a1 that are placed radially. The bottom portion 1a1 of the opposing tooth 1a is of a concave shape formed by a side surface of a cone Co1. The apices of the cones Co1 of multiple bottom portions 1a1 intersect at one point. The intersection point is an engagement center P. As described above, the engagement center P is on the axis 5a of the input shaft 5. The top portion 1a2 of the opposing tooth 1a is also of a convex shape formed by a side surface of a cone Co1' (refer to the enlarged side view of FIG. 7). The apices of the cones Co1' of multiple top portions 1a2 also intersect at the engagement center P.

The second crown gear 2 is bevel gear-shaped and has a conical body. The wave-shaped opposing teeth 2a are also continuously formed in the circumferential direction on a surface, which faces the third crown gear 3, of the ring-shaped second crown gear 2, as in the first crown gear 1. The second crown gear 2 alternately includes, in the circumferential direction, a plurality of top portions 2a2 that are placed radially, and a plurality of bottom portions 2a1 that are placed radially. The bottom portion 2a1 and the top portion 2a2 of the opposing tooth 2a of the second crown gear 2 are also formed by parts of side surfaces of cones Co2. The apices of the cones Co2 of the bottom portions 2a1 and the top portions 2a2 of the opposing teeth 2a of the second crown gear 2 intersect at one point at an engagement center P. The engagement center P of the second crown gear 2 agrees with the engagement center P of the first crown gear 1.

Figure 6:
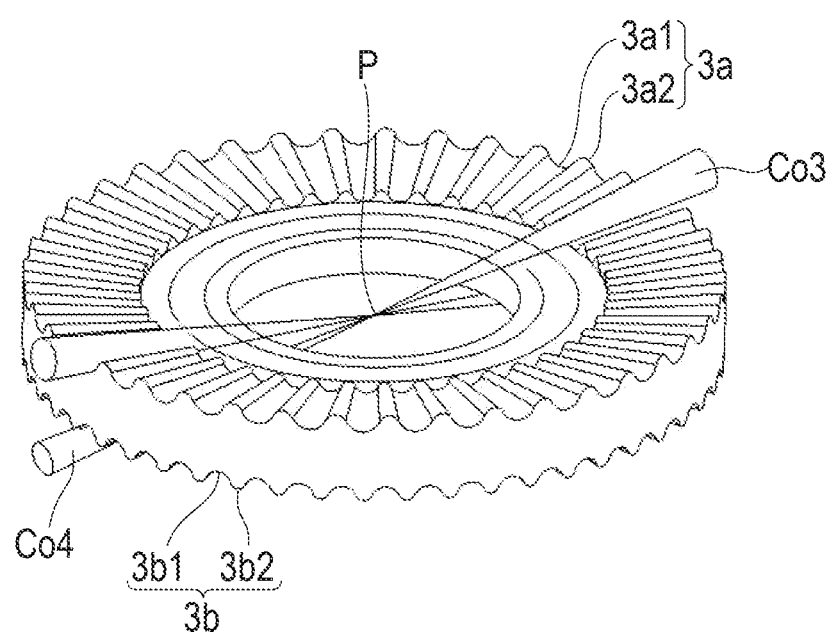
FIG. 6 is a perspective view illustrating the form of the teeth of the third crown gear of the embodiment.
Figure 7:
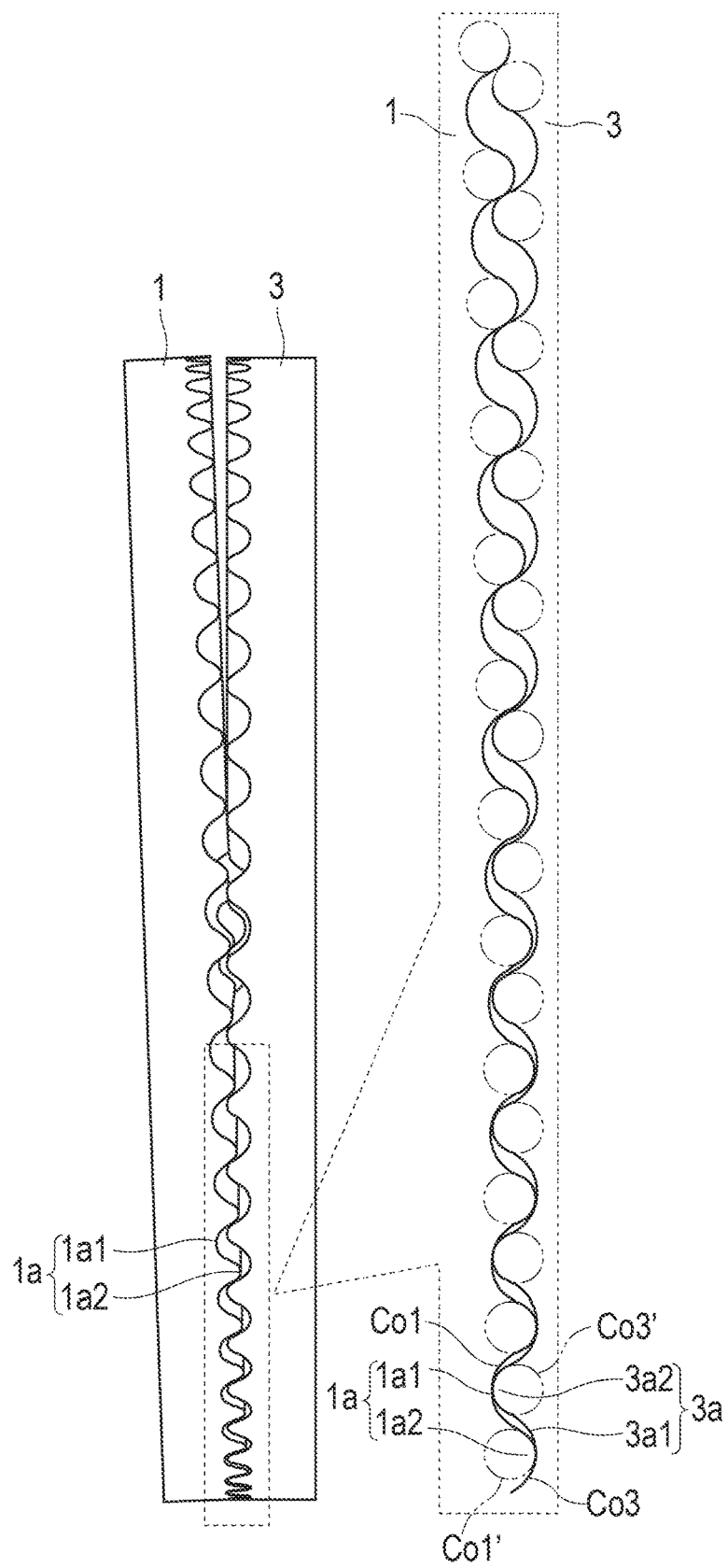
FIG. 7 is a side view illustrating engagement between opposing teeth of the first crown gear and opposing teeth of the third crown gear of the embodiment.

As illustrated in FIGS. 5B and 6, the third crown gear 3 is reverse bevel gear-shaped, having a side surface recessed like a bowl. The wave-shaped opposing teeth 3a facing the first crown gear 1 are continuously formed in the circumferential direction on the first crown gear 1 side of the third crown gear 3. The opposing teeth 3a alternately include, in the circumferential direction, a plurality of top portions 3a2 that are placed radially, and a plurality of bottom portions 3a1 that are placed radially. The bottom portion 3a1 of the opposing tooth 3a is formed by a part of a side surface of a cone Co3. The apices of the cones Co3 of multiple bottom portions 3a1 intersect at one point at an engagement center P. As illustrated in FIG. 7, the bottom portion 3a1 of the opposing tooth 3a of the inclined third crown gear 3 engages with the top portion 1a2 of the opposing tooth 1a of the first crown gear 1. Accordingly, the radius of the cone Co3 of the bottom portion 3a1 of the third crown gear 3 is larger than that of a cone Co1' of the top portion 1a2 of the first crown gear 1. The top portion 3a2 of the opposing tooth 3a of the third crown gear 3 is also formed by a part of a side surface of a cone Co3'. The apices of the cones Co3' of multiple top portions 3a2 intersect at one point at an engagement center P. As illustrated in FIG. 7, the top portion 3a2 of the opposing tooth 3a of the third crown gear 3 engages with the bottom portion 1a1 of the opposing tooth 1a of the first crown gear 1. Accordingly, the radius of the cone Co3' of the top portion 3a2 of the third crown gear 3 is smaller than that of the cone Co1 of the bottom portion 1a1 of the first crown gear 1.

As illustrated in FIGS. 5B and 6, the wave-shaped opposing teeth 3b facing the second crown gear 2 are continuously formed in the circumferential direction on the second crown gear 2 side of the third crown gear 3. The opposing teeth 3b alternately include, in the circumferential direction, a plurality of top portions 3b2 that are placed radially, and a plurality of bottom portions 3b1 that are placed radially. The bottom portion 3b1 and the top portion 3b2 of the opposing tooth 3b of the third crown gear 3 are formed by parts of side surfaces of cones Co4 (only the cone Co4 of the bottom portion 3b1 is illustrated). The apices of the cones Co4 of the bottom portions 3b1 and the top portions 3b2 of the opposing teeth 3b of the third crown gear 3 intersect at one point at an engagement center P. The engagement center P of the opposing teeth 3b of the third crown gear 3 agrees with the engagement center P of the opposing teeth 3a of the third crown gear 3. The engagement center P of the third crown gear 3 also agrees with the center P (refer to FIG. 1) of the wave motion of the third crown gear 3.

<Another Example of the Forms of Teeth of the First to Third Crown Gears (an Example where the Top Portion is Formed by a Side Surface of a Cone and the Bottom Portion is Generated Using a Trochoid Curve)>

Figure 8:
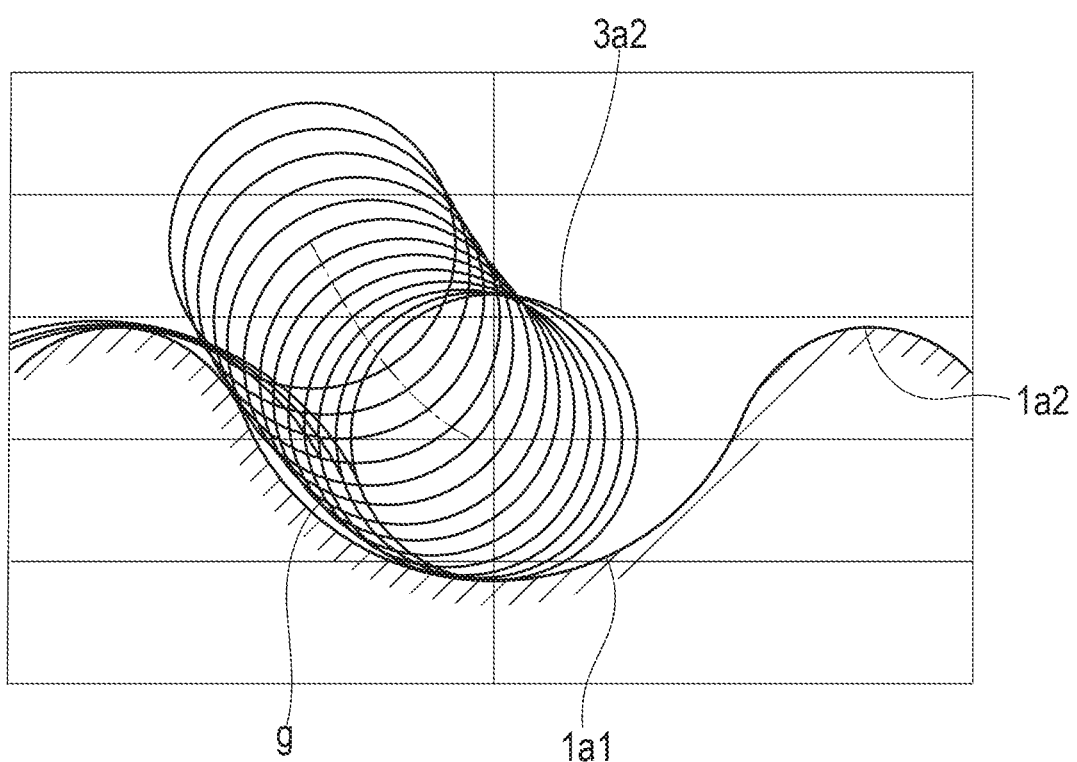
FIG. 8 is a developed view of the teeth of the first and third crown gears.

When the top portions 1a2, 2a2, 3a2, and 3b2, and the bottom portions 1a1, 2a1, 3a1, and 3b1 of the first to third crown gears 1 to 3 are each formed by a side surface of a cone, it is easy to manufacture the first to third crown gears 1 to 3. However, when the locus of the top portion 3a2 (illustrated in a circle) of the third crown gear 3 is described as illustrated in a developed view of the teeth of the first crown gear 1 and the third crown gear 3 of FIG. 8, a slight gap g is created between the first crown gear 1 and the third crown gear 3. The gap g may invite an angular transmission error and an increase in drive sound. This example illustrates that the gap g is eliminated to cause the top portion 3a2 and the bottom portion 1a1 to roll completely, and improve the angular transmission accuracy and the noise reduction performance. However, the gap g is very small. Even if the gap g is not eliminated, the angular transmission accuracy equal to an involute tooth profile is obtained. A method for designing the tooth profile curved surfaces of the first crown gear 1 and the third crown gear 3 is described below. However, the tooth profile curved surfaces of the second crown gear 2 and the third crown gear 3 can be similarly designed.

(An Overview of Design)

Figure 9:
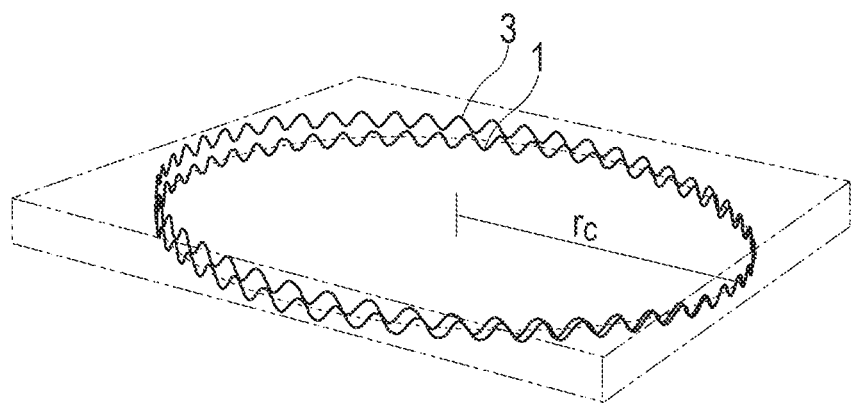
FIG. 9 is a perspective view illustrating tooth profile curves of the first and third crown gears on a reference circle $r_c$.

Firstly, the design of tooth profile curved surfaces of the first crown gear 1 and the third crown gear 3 starts with creating tooth profile curves of the first crown gear 1 and the third crown gear 3 on a reference circle $r_c$ as illustrated in FIG. 9. The created tooth profile curve is one curve, and is not a surface. In order to obtain tooth profile curved surfaces of the first crown gear 1 and the third crown gear 3, the tooth profile curves obtained by changing the radius $r_c$ of the reference circle are placed along the conical bodies of the first crown gear 1 and the third crown gear 3. Consequently, the tooth profile curved surfaces of the first crown gear 1 and the third crown gear 3 are obtained.

(A Design Guideline of Tooth Profile Curves)

It is assumed that the top portions 1a2 and 3a2 of the first crown gear 1 and the third crown gear 3 are formed by a side surface of a cone, and that the curves of the top portions 1a2 and 3a2 of the first crown gear 1 and the third crown gear 3 on the reference circle $r_c$ are arcs with a single R. At this point in time, the root curves of the bottom portions 1a1 and 3a1 are paths followed by the top portions 1a2 and 3a2 to cause both of the top portions 1a2 and 3a2 and the bottom portions 1a1 and 3a1 to undergo rolling motion. The arcs with the single R of the top portions 1a2 and 3a2 are smoothly connected to the root curves of the bottom portions 1a1 and 3a1 to obtain the tooth profile curves of the first crown gear 1 and the third crown gear 3 on the reference circle $r_c$ as illustrated in FIG. 9. The tooth profile curves are created in the following sequence.

(i) The curves (trochoid curves) along which the top portions 1a2 and 3a2 need to pass in wave motion (hereinafter referred to as precession) are obtained.

(ii) The radii of the top portions 1a2 and 3a2 are assumed to obtain curves described when the top portions 1a2 and 3a2 pass along the trochoid curves obtained in (i). The curves are defined as the root curves of the bottom portions 1a1 and 3a1.

(iii) The radii of the top portions 1a2 and 3a2 are determined in such a manner as to smoothly connect the addendum curves (arcs) of the top portions 1a2 and 3a2 to the root curves of the bottom portions 1a1 and 3a1.

(The Calculation of a Trochoid Curve where the Top Portion Needs to Pass)

The third crown gear 3 engages with the first crown gear 1 while undergoing precession. The first crown gear 1 has a conical body that protrudes toward the third crown gear 3. The third crown gear 3 has a conical body like a bowl recessed toward the first crown gear 1. The tooth flanks of the first crown gear 1 and the third crown gear 3 are on their respective conical bodies. Therefore, the congruent tooth profile curves lie in the circumferential direction. However, the tooth profile curves are similar but not congruent in the radial direction. Hence, a certain reference circle $r_c$ is determined to obtain tooth profile curves on the reference circle $r_c$.

Figure 10A:
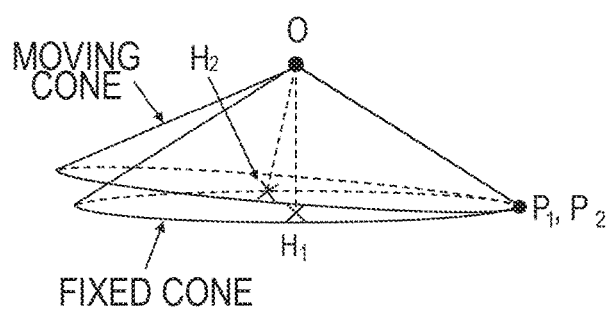
FIG. 10A is a perspective view illustrating a state where apices and generatrices of a moving cone (a body of the third crown gear) and a fixed cone (a body of the first crown gear) are in contact.
Figure 10B:
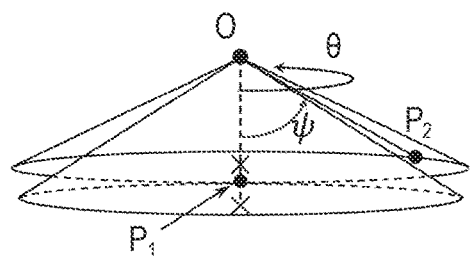
FIG. 10B is a perspective view illustrating the precession of the moving cone.
Figure 11:
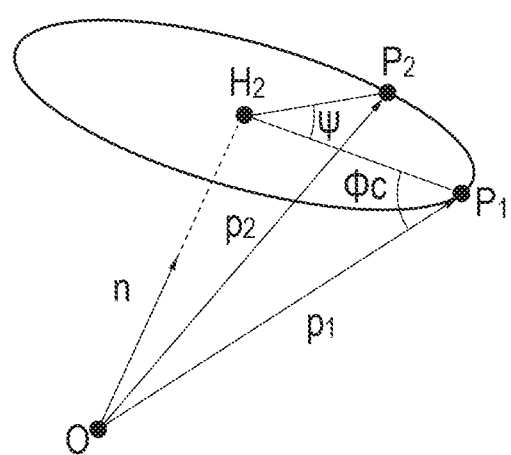
FIG. 11 is a diagram illustrating the relationships between points on the moving cone and vectors.

Firstly, there are two cones having the reference circle $r_c$ as a base, and a state is assumed in which their apices and generatrices are in contact as illustrated in FIG. 10A. Here, a cone undergoing precession is referred to as a moving cone, and a cone that is fixed as a fixed cone. The apex of the cone is referred to as an origin O, the point of contact between bases as a point $P_1$, a fixed point on the base of the moving cone as a point $P_2$, a leg of a perpendicular line described from the apex to the base of the fixed cone as $H_1$, and a leg of a perpendicular line described from the apex to the base of the moving cone as $H_2$. At this point in time, the locus described by the point $P_2$ when the moving cone undergoes precession is a curve (trochoid curve) along which the teeth need to pass. A case where the moving cone undergoes precession without departing from the fixed cone as illustrated in FIG. 10B is now considered. If the precession is assumed that the moving cone rotates by $-\phi$ about its own axis $OH_2$, and makes $\theta$ rotations around the fixed cone, the point $P_1$ is regarded to have rotated by $\theta$ about $OH_1$, and the point $P_2$ is regarded to have rotated by $-\phi$ about $OH_2$. As illustrated in FIG. 11, a vector normalized in parallel with the line segment $OH_2$ is referred to as n, a vector from the point O to the point $P_1$ as $p_1$, and a vector from the point O to the point $P_2$ as $p_2$. $p_2$ can be regarded as a vector obtained by rotating $p_1$ by $\phi$ about n; accordingly, it can be expressed as:

$$p_2 = p_1 \cos \psi + n(n \cdot p_1)(1 - \cos \psi) + (n \times p_1)\sin \psi \qquad [\text{Math. 2}]$$

If the base radius of the moving cone is $r_{cr}$, the base angle is $\phi_{cr}$, the base radius of the fixed cone is $r_{cf}$, and the base angle is $\phi_{cf}$, both of n and $p_1$ can be expressed as:

$$n = \begin{pmatrix} -\cos\theta\sin(\phi_{cf} - \phi_{cr}) \\ -\sin\theta\sin(\phi_{cf} - \phi_{cr}) \\ -\cos(\phi_{cf} - \phi_{cr}) \end{pmatrix} \qquad [\text{Math. 3}]$$

$$p_1 = \begin{pmatrix} r_{cf}\cos\theta \\ r_{cf}\sin\theta \\ -r_{cf}\tan\phi_{cf} \end{pmatrix}$$

Figure 12:
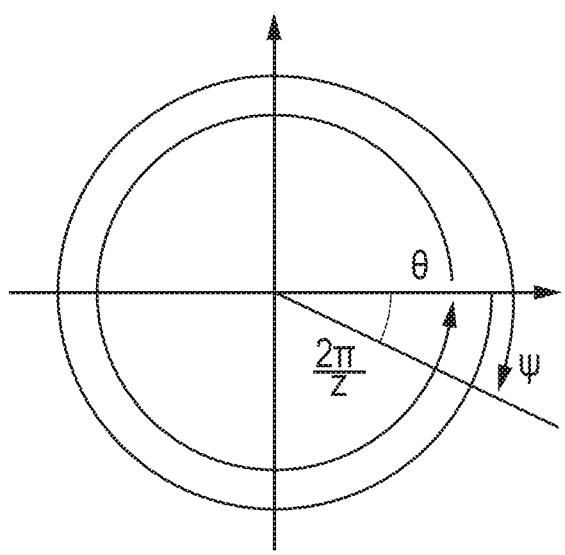
FIG. 12 is a graph illustrating the relationship between $\theta$ and $\phi$.

$p_2$ obtained up to this point can express a vector describing a curve along which the center of each of the top portions 1a2 and 3a2 of the first crown gear 1 and the third crown gear 3 needs to pass, by changing the value of $\phi$. Firstly, a curve along which the center of the top portion 3a2 of the third crown gear 3 needs to pass is obtained. The moving cone is regarded as the third crown gear 3, and the fixed cone as the first crown gear 1. Here, their numbers of teeth are $z_i$ and $z_0$, respectively. Moreover, parameters of the precession of the moving cone be $\theta = \theta_i$ and $\phi = \phi_i$. At this point in time, as illustrated in FIG. 12, in a case of a forward gear, $\phi$ rotates more for one tooth in an opposite direction while $\theta$ makes one rotation, and in a case of a backward gear, $\phi$ rotates less for one tooth in the opposite direction while $\theta$ makes one rotation. Accordingly, Math. 4 holds.

$$\begin{cases} \theta_i : \psi_i = 2\pi : -2\pi\left(1 + \dfrac{1}{z_i}\right) & (\text{NORMAL ROTATION}) \\ \theta_i : \psi_i = 2\pi : -2\pi\left(1 - \dfrac{1}{z_i}\right) & (\text{REVERSE ROTATION}) \end{cases} \qquad [\text{Math. 4}]$$

When they are organized, $$\begin{cases} \psi_i = -\frac{z_i + 1}{z_i}\theta_i & \text{(NORMAL ROTATION)} \\ \psi_i = -\frac{z_i - 1}{z_i}\theta_i & \text{(REVERSE ROTATION)} \end{cases} \quad \text{[Math. 5]}$$

If a curve along which the center of the top portion 1a2 of the first crown gear 1 needs to pass is obtained, the moving cone is regarded as the first crown gear 1, and the fixed cone as the third crown gear 3. Here, the parameters of precession are $\theta=\theta_o$ and $\phi=\phi_o$. Math. 6 holds similarly.

$$\begin{cases} \psi_o = -\frac{z_o - 1}{z_o}\theta_o & \text{(NORMAL ROTATION)} \\ \psi_o = -\frac{z_o + 1}{z_o}\theta_o & \text{(REVERSE ROTATION)} \end{cases} \quad \text{[Math. 6]}$$

Figure 13:
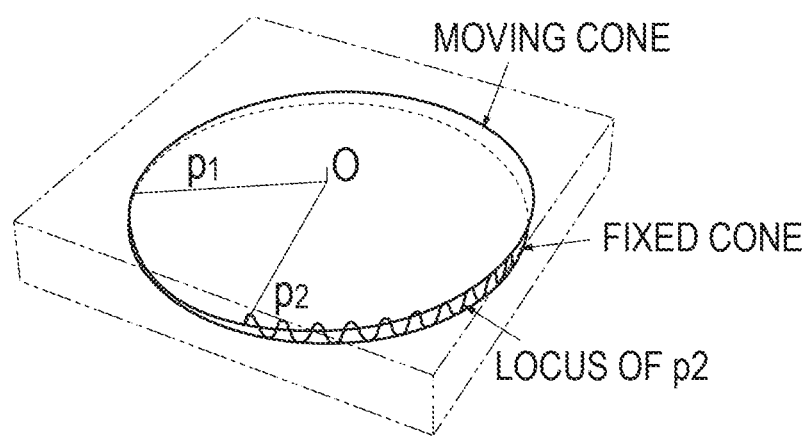
FIG. 13 is a perspective view illustrating a trochoid curve described by a vector $p_2$.

In this manner, Math. 5 or 6 is selected according to the characteristics of gears to be combined. $\phi$ is substituted into Math. 2 to obtain the curve along which the center of the top portion needs to pass. An example of the curve obtained at this point in time is illustrated in FIG. 13. In FIG. 13, the locus described by the vector $p_2$ is a trochoid curve. The rotation angle and direction of p1 and p2 are the same as those in FIG. 12.

(The Calculation of a Root Curve)

Figure 14:
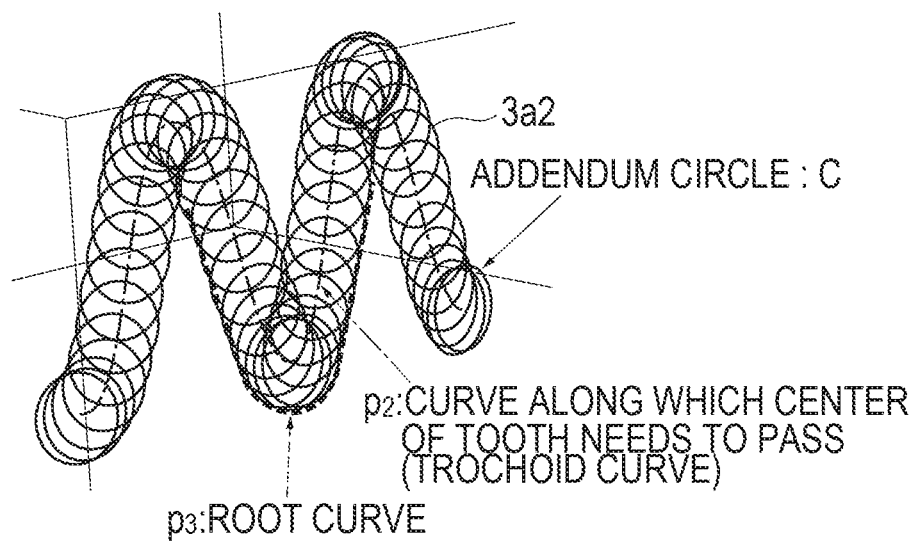
FIG. 14 is a perspective view illustrating the process of forming a root curve $p_3$.
Figure 15:
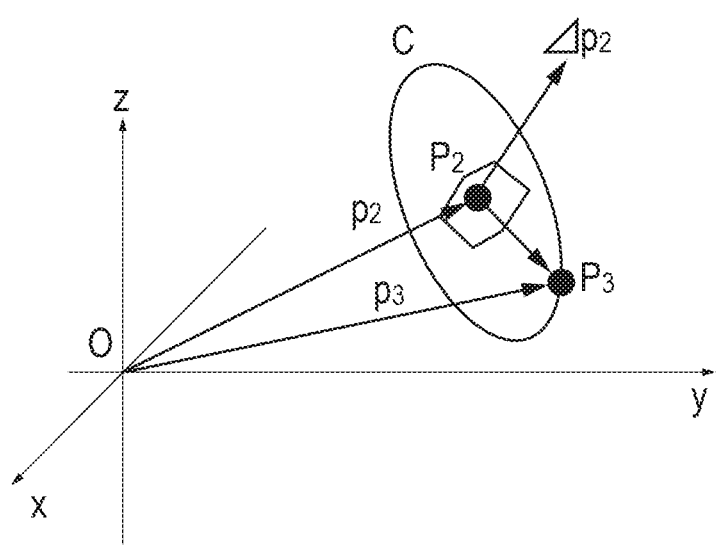
FIG. 15 is a graph illustrating how the root curve $p_3$ is obtained.

Next, a root curve is obtained. As illustrated in FIG. 14, the locus described by the top portion 3a2 of a counterpart gear is a root curve $p_3$. In other words, it is required to obtain the trochoid curve $p_2$ along which the center of the top portion 3a2 of the counterpart gear needs to pass and calculate a locus that is obtained when a circle having the radius of the top portion 3a2 of the counterpart gear is moved along the trochoid curve $p_2$. Here, the radius of the top of the counterpart gear is referred to as $h_k$, and the circle as C. At this point in time, as illustrated in FIG. 15, the vector $p_3$ describing the root curve is a vector up to the point $P_3$ orthogonal to both of $p_2$ and a direction vector $\Delta p_2$ of $p_2$ among points at the time when the circle C is drawn on $p_2$. Therefore, the relationship between Math. 7 and Math. 8 holds.

$$|p_3 - p_2| = h_k \quad \text{[Math. 7]}$$

$$p_2 \perp (p_3 - p_2) \text{ and } \Delta p_2 \perp (p_3 - p_2) \text{ and } p_2 \perp \Delta p_2 \quad \text{[Math. 8]}$$

From the above result, $$p_3 - p_2 = \pm h_k \frac{\Delta p_2 \times p_2}{|\Delta p_2 \times p_2|} \Leftrightarrow p_3 = p_2 \pm h_k \frac{\Delta p_2 \times p_2}{|\Delta p_2 \times p_2|} \quad \text{[Math. 9]}$$

holds. Plus or minus in the equation is determined by the direction of the direction vector.

(The Connection of the Addendum Curve and the Root Curve)

Figure 16A:
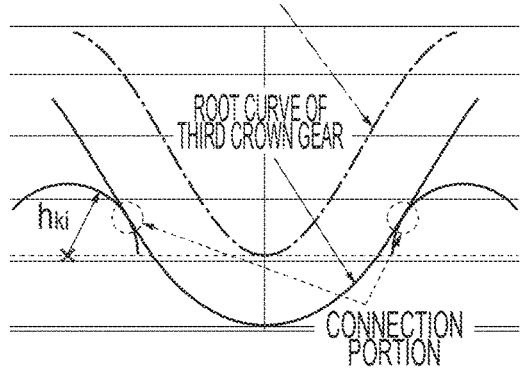
FIG. 16A illustrates a root curve of the third crown gear.
Figure 16B:
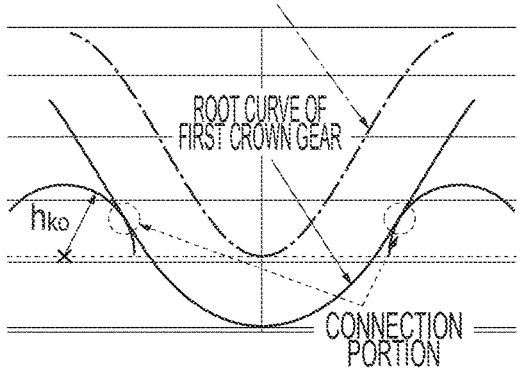
FIG. 16B illustrates a root curve of the first crown gear.

FIG. 16A illustrates the tooth profile curves (the addendum curve and the root curve) of the third crown gear 3 calculated in accordance with the above equations. FIG. 16B illustrates the tooth profile curves (the addendum curve and the root curve) of the first crown gear 1 calculated in accordance with the above equations. The radius of the addendum curve is determined in such a manner that the addendum curve is smoothly linked to the root curve. The radius of the addendum curve is determined on the condition "at the time when the addendum curve and the root curve have only one contact." (Equation of the addendum curve)=(equation of the root curve) is set up. The value of the radius of the top at the time when the above equation has a repeated root is found. From the above, the tooth profile curves of the first crown gear 1 and the third crown gear 3 can be generated.

Figure 17:
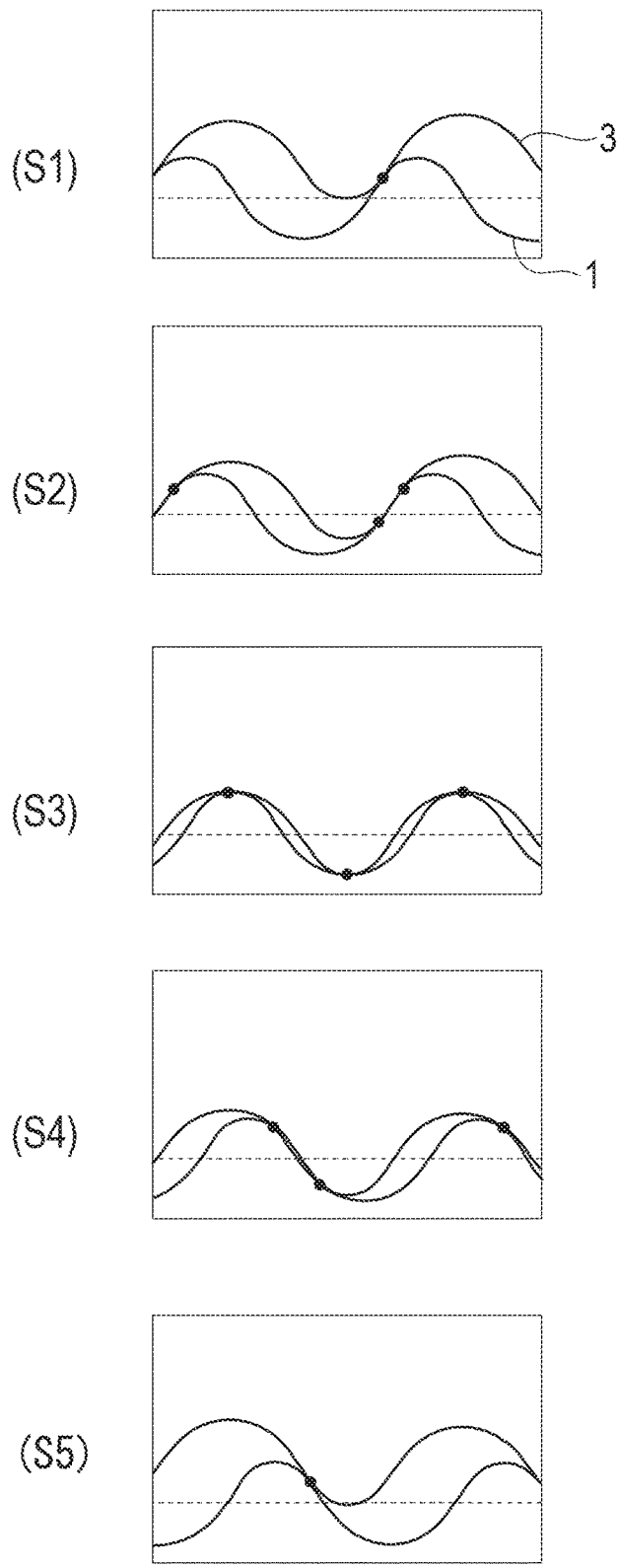
FIG. 17 is a diagram illustrating contacts between the first and third crown gears on the tooth profile curves.

FIG. 17 illustrates the tooth profile curves of the first crown gear 1 and the third crown gear 3 obtained in accordance with the above. Black dots in FIG. 17 illustrate the points of contact. It can be seen that the first crown gear 1 and the third crown gear 3 are always in contact and the points of contact move from the start of contact of (S1) to the end of contact of (S5). It can be seen from the movements of the points of contact that the first crown gear 1 and the third crown gear 3 roll on each other. FIG. 17 illustrates that the first crown gear 1 moves in the circumferential direction. However, the third crown gear 3 actually moves in the circumferential direction.

It is also possible to form the bottom portions 1a1 and 3a1 of the first crown gear 1 and the third crown gear 3 of a side surface of a cone, and generate the top portions 1a2 and 3a2 of the first crown gear 1 and the third crown gear 3 with trochoid curves. In this case, the curves of the bottom portions 1a1 and 3a1 of the first crown gear 1 and the third crown gear 3 on the reference circle $r_c$ are set as an arc with a single R, and the addendum curves of the top portions 1a2 and 3a2 are calculated with trochoid curves.

<Still Another Example of the Form of Teeth of the First to Third Crown Gears (an Example where the Tooth Trace is Helical)>

Figure 18:
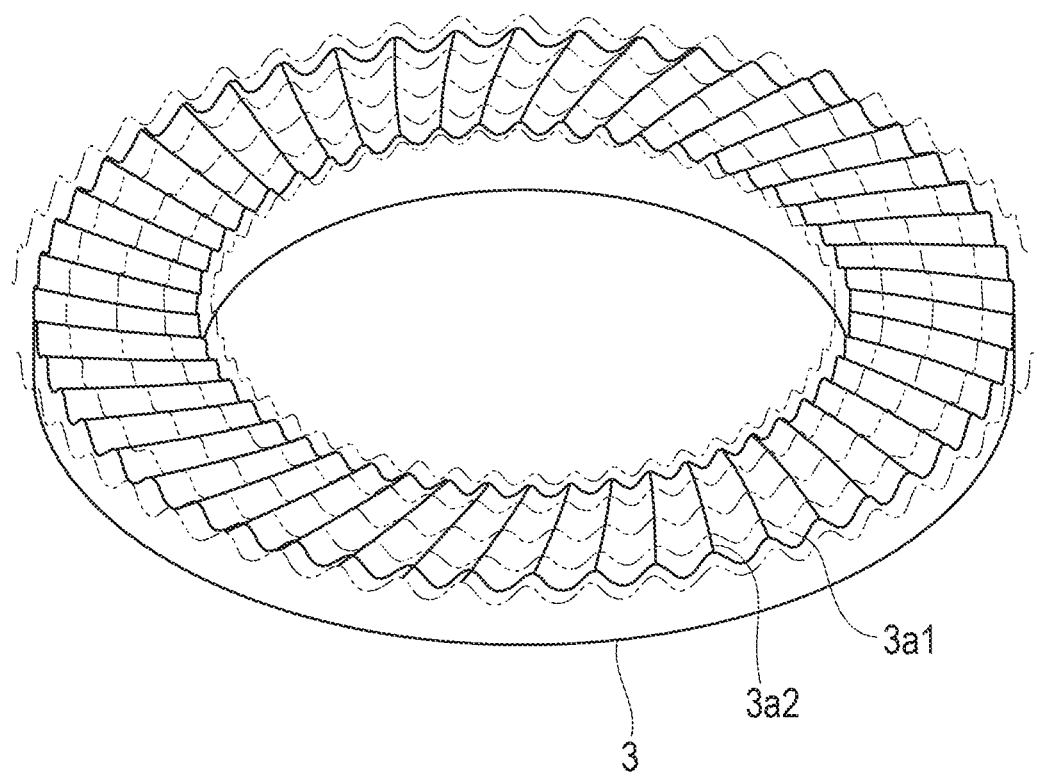
FIG. 18 is a perspective view of the second crown gear when a tooth trace is helical.

As illustrated in FIG. 18, the phase of the tooth profile curve of the third crown gear 3 on the reference circle is displaced in the circumferential direction whenever the radius of the reference circle is changed; accordingly, the tooth traces of the top portion 3a2 and the bottom portion 3a1 can be made helical. As illustrated in FIG. 18, the phase of the tooth profile curve is different at an outer side of the third crown gear 3 from the phase at an inner side of the third crown gear 3. Similarly, the tooth trace of the first crown gear 1 can also be made helical.

Figure 19:
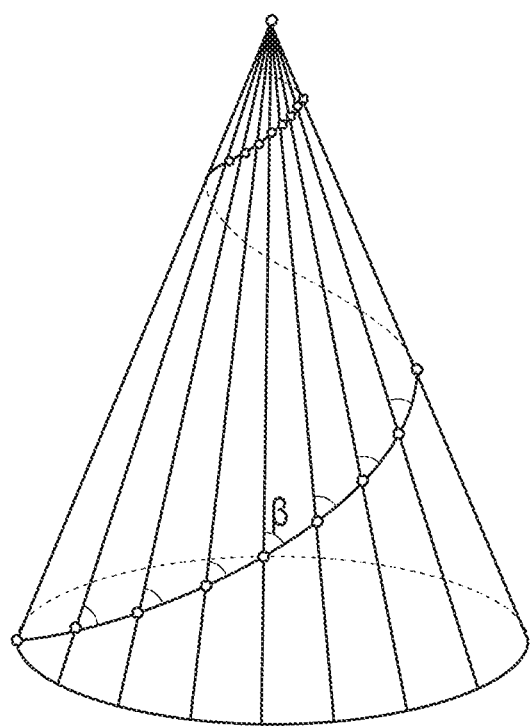
FIG. 19 is a perspective view illustrating a logarithmic spiral.

A logarithmic spiral illustrated in FIG. 19 can be adopted for the helical tooth trace. The logarithmic spiral is a spiral where an angle $\beta$ formed by the generatrix of a body of a cone is always constant, and can be expressed by Math. 10.

$$\begin{pmatrix} x \\ y \\ z \end{pmatrix} = \begin{pmatrix} ae^{b\theta}\cos\theta \\ ae^{b\theta}\sin\theta \\ ae^{b\theta}\tan\beta \end{pmatrix} \quad \text{[Math. 10]}$$

where a and b are parameters indicating how a spiral winds around.

<Effects of the Speed Reduction Apparatus of the Embodiment>

The structure of the speed reduction apparatus of the embodiment is described above. According to the speed reduction apparatus of the embodiment, the following effects are exerted.

The third crown gear 3 that undergoes wave motion is sandwiched between the first cam 11 and the second cam 12. Accordingly, the third crown gear 3 can be supported with high stiffness. Moreover, the first and second balls 15 and 17 are disposed between the first and second cams 11 and 12 and the third crown gear 3. Accordingly, it is possible to smoothly rotate the third crown gear 3 and improve the efficiency of the speed reduction apparatus.

The first and second cams 11 and 12 are fixed to the straight input shaft 5 that penetrates the first and second cams 11 and 12 and the third crown gear 3. Accordingly, the structure where the first and second cams 11 and 12 sandwich the third crown gear 3, and the assemblability of them is improved.

The first and second ball rolling grooves 11$a$1 and 12$a$1 are formed in the first and second cams 11 and 12. The third and fourth ball rolling grooves 3$c$1 and 3$c$2 are formed in the third crown gear 3. Accordingly, the loads that the first and second balls 15 and 17 can carry can be increased. The support stiffness of the third crown gear 3 is further improved.

The center C1 of the first ball rolling groove 11$a$1 of the first cam 11 and the center C2 of the second ball rolling groove 12$a$1 of the second cam 12 are displaced from the axis 5$a$ of the input shaft 5. Accordingly, the center P of the wave motion of the thick third crown gear 3 can be placed on the axis 5$a$ of the input shaft 5.

The top portion 1$a$2 of the first crown gear 1, the top portion 2$a$2 of the second crown gear 2, the top portions 3$a$2 and 3$b$2 of the third crown gear 3 have convex shapes based on side surfaces of the cones Co1' to Co4' (only Co1' and Co3' are illustrated). The bottom portion 1$a$1 of the first crown gear 1, the bottom portion 2$a$1 of the second crown gear 2, and the bottom portions 3$a$1 and 3$b$1 of the third crown gear 3 have concave shapes based on side surfaces of the cones Co1 to Co4. Accordingly, the first crown gear 1 to the third crown gear 3 engage with each other, mostly rolling. Therefore, the gear efficiency can be improved.

In the present invention, the "convex and concave shapes based on side surfaces of cones" include convex and concave shapes formed by side surfaces of the cones Co1 to Co4 and Co1' to Co4', and convex and concave shapes generated using generated using a trochoid curve described when the conical body of the third crown gear 3 is rolled along the conical body of the first crown gear 1 or the second crown gear 2. Moreover, a case is also included in which tooth traces of the top portions 1$a$2, 2$a$2, 3$a$2, and 3$b$2 and the bottom portions 1$a$1, 2$a$1, 3$a$1, and 3$b$1 having such convex and concave shapes are helical.

The apices P of the cones Co1 to Co4 and Co1' to Co4' agree with the center P of the precession of the third crown gear 3. Accordingly, the top portions 1$a$2, 2$a$2, 3$a$2, and 3$b$2 can be brought into line contact with the bottom portions 1$a$1, 2$a$1, 3$a$1, and 3$b$1. The area of contact and the contact ratio can be increased. Accordingly, stiffness, efficiency, and noise reduction can be increased.

The present invention is not limited to the realization of the above embodiment, and can be realized in various embodiments within the scope that does not change the gist of the present invention. In the above embodiment, the first and second balls are disposed between the first and second cams and the third crown gear. However, a first roller and a second roller may be disposed therebetween.

INDUSTRIAL APPLICABILITY

The application of the speed reduction or speed increasing apparatus of the present invention is not particularly limited. The present invention can be used for various applications such as a joint of a robot, a machine tool, and an automobile. The speed reduction ratio can be increased, and there is no backlash. Accordingly, the present invention is suitable for highly precise positioning, and can also be used for a semiconductor or liquid crystal manufacturing apparatus, an electron microscope, and the like. Moreover, the present invention can also be used as a speed increasing apparatus by replacing the locations of the input side and the output side, and can be used as a speed increasing apparatus of a generator having large power on the input side, such as a hydro power generator.

The present description is based on Japanese Patent Application No. 2015-105072 filed on May 25, 2015 and Japanese Patent Application No. 2016-039521 filed on Mar. 2, 2016, the entire contents of which are incorporated herein.

REFERENCE SIGNS LIST

1 First crown gear,
1$a$ Opposing tooth of the first crown gear,
1$a$1 Bottom portion of the opposing tooth of the first crown gear,
1$a$2 Top portion of the opposing tooth of the first crown gear,
2 Second crown gear,
2$a$ Opposing tooth of the second crown gear,
2$a$1 Bottom portion of the opposing tooth of the second crown gear,
2$a$2 Top portion of the opposing tooth of the second crown gear,
3 Third crown gear,
3$a$ Opposing tooth of the third crown gear,
3$a$1 Bottom portion of the opposing tooth of the third crown gear,
3$a$2 Top portion of the opposing tooth of the third crown gear,
3$b$ Opposing tooth of the third crown gear,
3$b$1 Bottom portion of the opposing tooth of the third crown gear,
3$b$2 Top portion of the opposing tooth of the third crown gear,
3$c$1 Third ball rolling groove (third rolling element rolling groove),
3$c$2 Fourth ball rolling groove (fourth rolling element rolling groove),
5 Input shaft (shaft),
5$a$ Axis,
7 Output portion,
11 First cam (cam unit),
11$a$ First inclined surface,
11$a$1 First ball rolling groove (first rolling element rolling groove),
12 Second cam (cam unit),
12$a$ Second inclined surface,
12$a$1 Second ball rolling groove (second rolling element rolling groove),
15 First ball (first rolling element),
17 Second ball (second rolling element),
C1 Center of the first ball rolling groove (center of the first rolling element rolling groove),
C2 Center of the second ball rolling groove (center of the second rolling element rolling groove),
P Engagement center of the first to third crown gears (center of the wave motion of the third crown gear),
Co1 to Co4, Co1', Co3' Cone

The invention claimed is:
1. A speed reduction or speed increasing apparatus, comprising:

a first crown gear fixed to a housing;
a second crown gear fixed to an output portion and rotatable with respect to the housing;
a third crown gear having opposing teeth facing the first crown gear and opposing teeth facing the second gear, back to back with respect to each other; and
a cam unit configured to incline the third crown gear with respect to the first and second crown gears in such a manner that the third crown gear engages with the first crown gear and the third crown gear engages with the second crown gear, and to cause the third crown gear to undergo wave motion in such a manner that locations of contact move in a circumferential direction,
wherein:
the cam unit includes a first cam placed on the first crown gear side with respect to the third crown gear, and a second cam placed on the second crown gear side with respect to the third crown gear,
the first cam and the second cam sandwich the third crown gear,
a first rolling element is disposed between the first cam and the third crown gear in such a manner as to be capable of rolling motion,
a second rolling element is disposed between the second cam and the third crown gear in such a manner as to be capable of rolling motion,
the first and second cams are fixed to an input shaft so as not to be rotatable,
the first cam is directly rotatably supported by a first bearing disposed between the first crown gear and the first cam, and
the second cam is directly rotatably supported by a second bearing disposed between the second crown gear and the second cam.

2. The speed reduction or speed increasing apparatus according to claim 1, wherein the first and second cams are fixed to the input shaft which penetrates the first and second cams and the third crown gear.

3. The speed reduction or speed increasing apparatus according to claim 2, wherein:
the first and second cams include a first inclined surface and a second inclined surface parallel to each other, the first and second inclined surfaces being inclined with respect to an axis of the first and second cams,
a first rolling element rolling groove and a second rolling element rolling groove that are circular as viewed from a direction orthogonal to the first and second inclined surfaces are formed in the first and second inclined surfaces, and
circular third and fourth rolling element rolling grooves facing the first and second rolling element rolling grooves are formed back to back in the third crown gear.

4. The speed reduction or speed increasing apparatus according to claim 3, wherein:
the opposing teeth of the first, second, and third crown gears alternately include top portions and bottom portions in the circumferential direction,
the top portion is of a convex shape based on a part of a side surface of a cone, and
the bottom portion is of a concave shape based on a part of a side surface of a cone.

5. The speed reduction or speed increasing apparatus according to claim 2, wherein:
the opposing teeth of the first, second, and third crown gears alternately include top portions and bottom portions in the circumferential direction,
the top portion is of a convex shape based on a part of a side surface of a cone, and
the bottom portion is of a concave shape based on a part of a side surface of a cone.

6. The speed reduction or speed increasing apparatus according to claim 2, wherein the input shaft is a straight input shaft.

7. The speed reduction or speed increasing apparatus according to claim 1, wherein:
the first and second cams include a first inclined surface and a second inclined surface parallel to each other, the first and second inclined surfaces being inclined with respect to an axis of the first and second cams,
a first rolling element rolling groove and a second rolling element rolling groove that are circular as viewed from a direction orthogonal to the first and second inclined surfaces are formed in the first and second inclined surfaces, and
circular third and fourth rolling element rolling grooves facing the first and second rolling element rolling grooves are formed back to back in the third crown gear.

8. The speed reduction or speed increasing apparatus according to claim 7, wherein:
the opposing teeth of the first, second, and third crown gears alternately include top portions and bottom portions in the circumferential direction,
the top portion is of a convex shape based on a part of a side surface of a cone, and
the bottom portion is of a concave shape based on a part of a side surface of a cone.

9. The speed reduction or speed increasing apparatus according to claim 7, wherein the center of the first rolling element rolling groove of the first cam and the center of the second rolling element rolling groove of the second cam are displaced from the axis of the first and second cams in such a manner that the center of the wave motion of the third crown gear is on the axis.

10. The speed reduction or speed increasing apparatus according to claim 9, wherein:
the opposing teeth of the first, second, and third crown gears alternately include top portions and bottom portions in the circumferential direction,
the top portion is of a convex shape based on a part of a side surface of a cone, and
the bottom portion is of a concave shape based on a part of a side surface of a cone.

11. The speed reduction or speed increasing apparatus according to claim 1, wherein:
the opposing teeth of the first, second, and third crown gears alternately include top portions and bottom portions in the circumferential direction,
the top portion is of a convex shape based on a part of a side surface of a cone, and
the bottom portion is of a concave shape based on a part of a side surface of a cone.

12. The speed reduction or speed increasing apparatus according to claim 11, wherein a position of the apices of the cones agree with a position of the center of the wave motion of the third crown gear.

* * * * *